US012639266B1

(12) United States Patent
Goren et al.

(10) Patent No.: US 12,639,266 B1
(45) Date of Patent: May 26, 2026

(54) METADATA COMPRESSION

(71) Applicant: VAST DATA LTD., Tel Aviv (IL)

(72) Inventors: Avi Goren, Tel Aviv (IL); Noam Inbar, Tel Aviv (IL); Oded Sonin, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 0 days.

(21) Appl. No.: 18/762,604

(22) Filed: Jul. 2, 2024

(51) Int. Cl.
*G06F 16/174* (2019.01)

(52) U.S. Cl.
CPC ................................ *G06F 16/1744* (2019.01)

(58) Field of Classification Search
CPC .................................................. G06F 16/1744
See application file for complete search history.

(56) References Cited

U.S. PATENT DOCUMENTS

| | | | | | |
|---|---|---|---|---|---|
| 5,675,789 A | * | 10/1997 | Ishii | ...................... | G06F 3/0643 |
| | | | | | 708/203 |
| 6,360,213 B1 | * | 3/2002 | Wagstaff | .............. | G06F 16/284 |
| 9,225,729 B1 | * | 12/2015 | Moen | .................. | H04L 63/0876 |
| 2002/0118799 A1 | * | 8/2002 | Detlef | ................. | H04M 1/6505 |
| | | | | | 379/70 |
| 2008/0021908 A1 | * | 1/2008 | Trask | .................. | G06F 16/9014 |
| 2017/0255708 A1 | * | 9/2017 | Cho | ........................ | G06F 16/22 |

* cited by examiner

*Primary Examiner* — Marc S Somers

(74) *Attorney, Agent, or Firm* — Reches Patentss

(57) ABSTRACT

A method for managing metadata blocks of file system entities (FSEs), the method includes (i) determining, by a processing circuit of a storage system, a stress level that is non-linearly dependent upon a fullness of static FSE metadata blocks and a fullness of dynamic FSE metadata blocks, wherein the static FSE metadata blocks store FSE metadata items of a first type and the dynamic FSE metadata blocks store FSE metadata items of a second type and additional FSE metadata items of a first type; (ii) determining, based on the stress level and a fullness parameter, a probability of applying a conditional compression process on a new FSE metadata block; and (iii) applying the conditional compression process, based on the probability, on the new FSE metadata block.

18 Claims, 5 Drawing Sheets

Determining, by a processing circuit of a storage system, a stress level that is non-linearly dependent upon a fullness of static FSE metadata blocks and a fullness of dynamic FSE metadata blocks. 310

Determining, based on the stress level and a fullness parameter, a probability of applying a conditional compression process on a new FSE metadata block 320

Applying the conditional compression process, based on the probability, on the new FSE metadata block 330

300

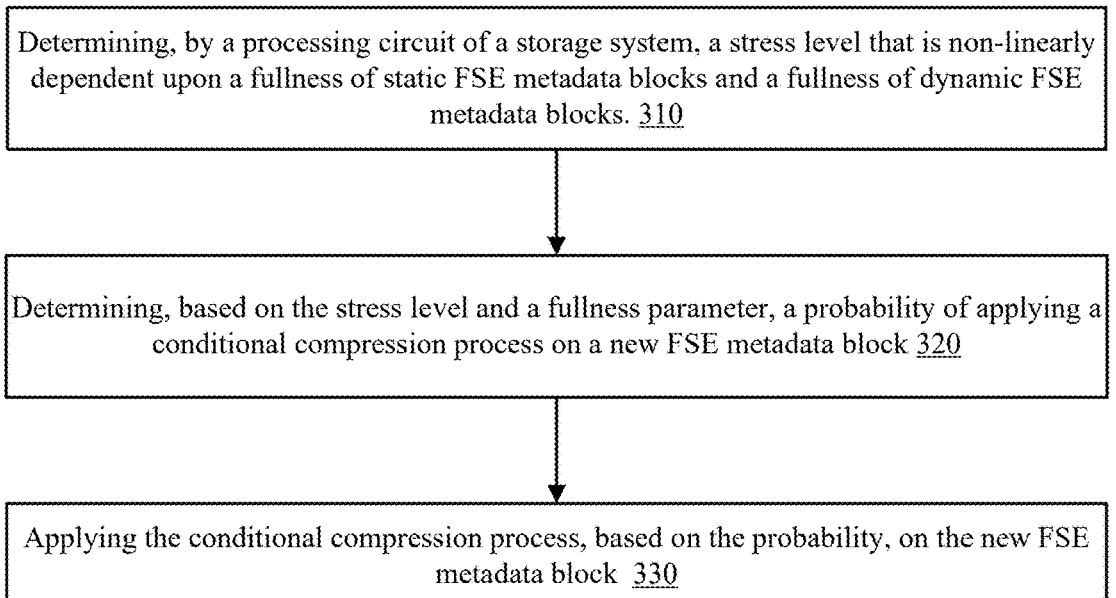

Determining, by a processing circuit of a storage system, a stress level that is non-linearly dependent upon a fullness of static FSE metadata blocks and a fullness of dynamic FSE metadata blocks. 310

Determining, based on the stress level and a fullness parameter, a probability of applying a conditional compression process on a new FSE metadata block 320

Applying the conditional compression process, based on the probability, on the new FSE metadata block 330

Static FSE metadata block. 410(1)

| FSE_MD_item_1(1,1) 401(1,1) | — — — | FSE_MD_item_1(1,N1) 401(1,N1) |

Static FSE metadata block. 410(Q)

| FSE_MD_item_1(Q,1) 401(Q,1) | — — — | FSE_MD_item_1(Q,N2) 401(Q,N2) |

Dynamic FSE metadata block. 420(1)

| Add_FSE_MD_item_1 (1,1) 403(1,1) | FSE_MD_item_2(1,1) 402(1,1) | — — — | FSE_MD_item_2(2,K1) 402(1,K1) |

Dynamic FSE metadata block. 420(J)

| FSE_MD_item_2(J,1) 402(J,1) | — — — | FSE_MD_item_2(J,K2) 402(J,K2) |

New FSE metadata block 430(1)

Compressed FSE metadata block 440(1)

METADATA COMPRESSION

BACKGROUND

Filesystems manage metadata of files and directories, in addition to file's content. The metadata includes names, attributes, access permissions, timestamps and pointers to data.

Modern filesystems can manage billions of files and directories that require storing vast amounts of metadata regarding file system entities such as files and directories. Since every access to a filesystem entity involves reading and updating the metadata, the metadata becomes the most frequently accessed part of the filesystem, and therefore requires fast access, while coping with the vast amount of storage space required for storing the metadata.

There is a growing need to manage the storage of said metadata in an efficient manner.

SUMMARY

There may be provided a method, a system and a non-transitory computer readable medium as illustrated in the application.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

FIG. 3 is an example of a method;

DETAILED DESCRIPTION OF THE DRAWINGS

Figure 1:
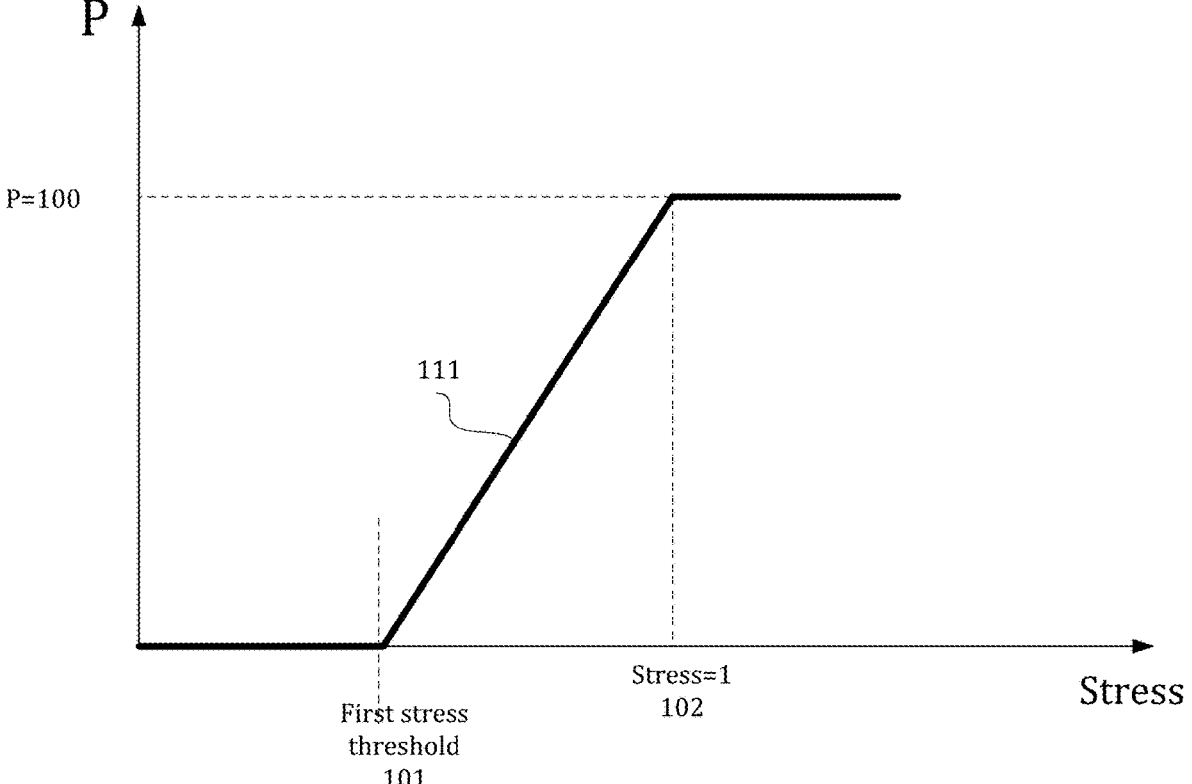
FIG. 1 is an example of stress levels and probabilities.

A filesystem includes metadata that is composed of various metadata blocks. There are two types of pools of metadata blocks that are allocated independently: dynamically allocated blocks and static allocated blocks, wherein the latter are arranged as a big static array of blocks located in a pre-defined physical location in the storage space of the filesystem.

The static allocated blocks are metadata blocks that store basic information about files and directories in the filesystem, wherein each block includes basic information about one or more filesystem entities (FSEs, e.g., files, directories, objects, etc.), such as file or directory identifiers (e.g., handles, inodes) and pointers to dynamically allocated blocks that stores the rest of the FSE's metadata. The static array is located in a pre-defined physical location in the storage space of the filesystem, because it includes the roots of the filesystem trees, and the roots are not referred to by any other blocks, therefore this array needs to be anchored. The basic information may be included in metadata items of a first type.

The dynamically allocated blocks store further information about FSEs, such as offset information and pointers to stored data-when the FSE is a file, or information about file names—when the FSE is a directory. The dynamically allocated blocks may include any further information that cannot be fit into the static allocated blocks. The further information may be included in metadata items of a second type.

Initially, the metadata items of a first type are stored in static FSE metadata blocks and the metadata items of the second type are stored in dynamic FSE metadata blocks.

As will be illustrated in the following text, over time additional FSE metadata items of the first type are stored in the dynamic FSE metadata blocks.

There is a need to compress at least part of the metadata (MD) blocks, for the purposes of: (i) saving space and increasing the storage capacity, and (ii) enabling incrementing the number of FSEs that can be stored in the storage system, since the number of maximum FSEs may be limited by the space allocated to the static array.

According to embodiments of the invention, the extent of performing block compression follows the fullness level of both the static allocated blocks and the dynamic allocated blocks. The "extent of performing block compression" refers to the percentage of blocks (particularly new allocated blocks) to which it is decided that compression should be applied. This percentage is zero under a first (low) fullness level, gradually increasing when the fullness level starts rising above the first fullness level, and accelerated when the fullness continues rising, until the percentage hits a 100% of the new blocks that are to be compressed, when the fullness exceeds a second fullness level (that is higher than the first fullness level). The start point of compressing some of the new MD blocks, and the acceleration of the compression percentage are dependent on the combined fullness level, combining both the static and dynamic fullness levels.

The combined fullness level, also referred to as a stress level, is calculated to present the impact of both the static fullness level (fullness of the static MD blocks) and the dynamic fullness level (fullness of the dynamic MD blocks).

The compression is considered only when the stress level exceeds a first (minimum) stress threshold, which may be relatively low, e.g., reflecting a fullness level of 16%-32%, and is performed only to a portion of new allocated blocks, wherein the portion size is proportional to a current stress level. Only when the stress level exceeds a second stress threshold (e.g., 60%)—all the new blocks are compressed. The first stress threshold, that triggers a starting of compression, is relatively low, so as to avoid situations of an urgent need to compress most of the blocks, which will cause a sudden prominent degradation of the performance.

The stress level combines the state of both types of MD blocks, because newly added FSEs may initially occupy only static MD blocks, but sooner or later these FSE's metadata will require allocation of dynamic MD blocks. Furthermore, when a new file identifier is supposed to be added to a designated static MD block (e.g., wherein the designated static MD block may be dictated by a hash function applied on the new file's handle), and the designated static MD block is full, a dynamic MD block is allocated and serves as an extension to the list of file identifiers that are mapped to the designated static MD block. Therefore, an increased fullness of the static MD blocks can influence the fullness of the dynamic MD blocks.

The stress level may be incremented in an exponential manner (or any other non-linear manner) as a function of both static MD fullness level and dynamic MD fullness level, so that the compression rate is accelerated when at least one of the fullness levels increases. The stress level may be, for example:

$S(Dmd, Smd)=a*Dmd^2+b*Smd^2$; wherein S—is the stress level, Dmd—is the dynamic MD fullness level, Smd—is the static MD fullness level; a and b—are coefficients.

The coefficients may be selected according to configurable extrema points that define the margins of fullness levels. An upmost extreme point may be related to a second (high) fullness level of either one of the MD block types, under which compression is performed for 100% of the new MD blocks of both types. For example: S(0, Smd=30%)=1, and S(Dmd=60%, 0)=1; when Smd=30% or Dmd=60%.

The lowest extreme point may be related to fullness levels under which no compression is triggered, and above which a compression is started for a small portion of the MD blocks. For example:

s(first_Dmd_fullness level=32%, 0)=0, and s(0, first_Smd_fullness level=16%)=0; when Smd=16% or Dmd=32%.

The stress level is used for defining the probability for deciding whether a new block will be compressed or not. The stress level values are, e.g., between zero to one, and these values should be mapped into a compression probability between 0%-100% (or 0-1), however, the boundaries of the compression probability are not the same as the stress boundaries, because there is no need to start compressing when the stress level is above zero but below a first stress level, while it is desired to compress 100% of the blocks when the stress level is 1.

FIG. 1 illustrates the probability of compressing a new MD block as a function of the stress level, as demonstrated by a line 111. While the stress is below a first stress threshold 101, the probability is zero, i.e., no compression takes place. Above first stress threshold 101, the probability rises with the stress until reaching a point 102 when the stress is 1, and the probability is 100%, i.e., every new MD block, either static or dynamic, is compressed. Though this is a linear function, the stress is a non-linear function (e.g., exponential function) of the dynamic and static fulness levels.

Figure 2:
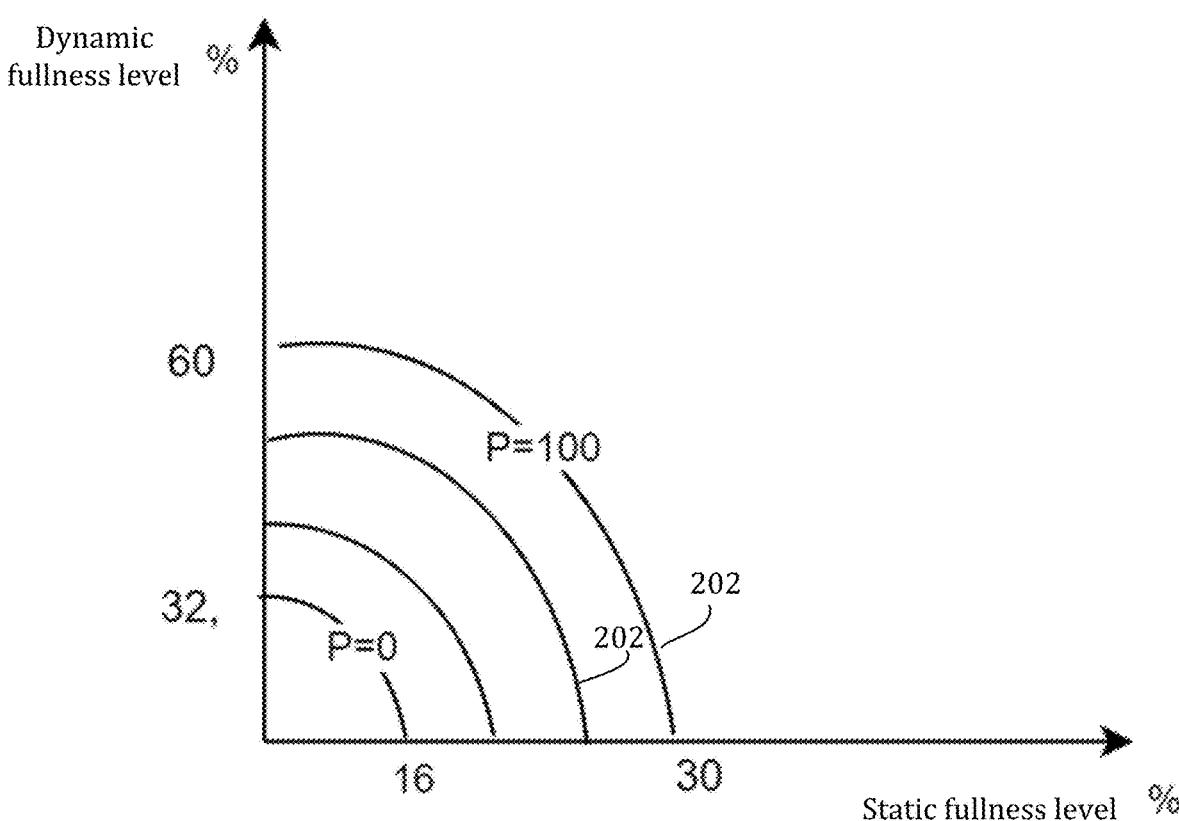
FIG. 2 is an example of stress levels and probabilities.

FIG. 2 illustrates a graph of the static fulness level, the dynamic fullness level and the probability. In this example, the first fullness level of the static MD blocks is set to 16% (under which the probability is 0, regardless of the state of the dynamic fulness level), the first fullness level of the dynamic MD blocks is set to 32% (under which the probability is 0, regardless of the state of the static fulness level), the second fullness level of the static MD blocks is set to 30% (above which the probability is 100, regardless of the state of the dynamic fulness level)), and the second fullness level of the dynamic MD blocks is set to 60% (above which the probability is 100, regardless of the state of the static fulness level).

Adding the probability as a third axis of curve would form a 3D paraboloid. To illustrate the probability as a function of the static and dynamic fullness, curved lines 202 are elevation lines which represent equal probability along the curved/elevation lines. For example, the probability is 100% for any combination of Smd and Dmd on the curve connecting static fullness of 30% with dynamic fullness of 60%, the probability is 0% for any combination of Smd and Dmd on the curve connecting static fullness of 16% with dynamic fullness of 32%.

When a new MD block (either dynamic or static) is allocated, the probability that is associated with the current stress is determined. A random number is selected, and if it is below the probability—then the new MD block is compressed, otherwise—the new MD block remains uncompressed.

FIG. 3 illustrates an example of method 300 for managing metadata blocks of file system entities (FSEs).

According to an embodiment, method 300 includes step 310 of determining, by a processing circuit of a storage system, a stress level that is non-linearly dependent upon a fullness of static FSE metadata blocks and a fullness of dynamic FSE metadata blocks. The static FSE metadata blocks store FSE metadata items of a first type and the dynamic FSE metadata blocks store FSE metadata items of a second type and additional FSE metadata items of a first type.

According to an embodiment, at least one of the FSE metadata items of a first type and at least one of the additional FSE metadata items of a first type share a same hash value. For example, when allocating metadata blocks for a new FSE, a static FSE metadata block is selected for storing metadata items of a first type, e.g., a FSE identifier of the FSE. The static FSE metadata block is selected based on a hash function that is applied on the FSE identifier. The selected static FSE metadata block is a metadata block that is accessed by using the hash value resulted from the hash function. However, when accessing the selected static FSE metadata block—it is found to be full, with other first type metadata items (e.g., FSE identifiers) of other FSEs, having FSE identifiers that result the same hash value. Therefore, a dynamic FSE metadata block is allocated for storing the first type metadata items of the new FSE. A pointer to the dynamic FSE metadata block is added to the selected static FSE metadata block. Now, the selected static FSE metadata block and the pointed dynamic FSE metadata block—both include metadata items of the first type (e.g., FSE identifiers) that results in the same hash value.

According to an embodiment, the stress level is determined based on a square of the fullness of static FSE metadata blocks and of a square of the fullness of dynamic FSE metadata blocks.

According to an embodiment, the stress level is weighted sum of (i) a square of the fullness of static FSE metadata blocks, and (ii) a square of the fullness of dynamic FSE metadata blocks.

For example—$S(Dmd, Smd)=a*Dmd^2+b*Smd^2$. S is the stress level. Dmd is the dynamic MD fullness level. Smd is the static MD fullness level. The weights are a and b.

According to an embodiment, weights of the weighted sum are determined based on an extremum value of at least one of the fullness of static FSE metadata blocks and the fullness of dynamic FSE metadata blocks.

For example—a and b may be selected according to configurable extrema points that define the margins of fullness levels. An upmost extreme point may be related to a second (high) fullness level of either one of the MD block types, under which compression is performed for 100% of the new MD blocks of both types. For example: S(0, Smd=30%)=1, and S(Dmd=60%, 0)=1; when Smd=30% or Dmd=60%. The lowest extreme point may be related to fullness levels under which no compression is triggered, and above which a compression is started for a small portion of the MD blocks.

For example: s(first_Dmd_fullness level=32%, 0)=0, and s(0, first_Smd_fullness level=16%)=0; when Smd=16% or Dmd=32%.

According to an embodiment, step 310 is followed by step 320 of determining, based on the stress level and a fullness parameter, a probability of applying a conditional compression process on a new FSE metadata block. The fullness parameter may include either one or both of the static fullness level or the dynamic fullness level, whether any of the static or dynamic fullness levels is below a first level that requires start applying a conditional compression process (in which case the probability is zero), and whether any of the static or dynamic fullness levels is above a second level that requires non-conditional compression for any new FSE metadata block, static or dynamic.

According to an embodiment, step 320 is followed by step 330 of applying the conditional compression process, based on the probability, on the new FSE metadata block.

According to an embodiment, the conditional compression process is conditional in the sense that the compression depends on an outcome of a random process-especially on a relationship between the probability calculated in step 320 and the outcome of the random process.

According to an embodiment, step 330 includes:

a. Obtaining a random number.

b. Comparing the random number to the probability calculated in step 320.

c. Compressing the new FSE metadata block when a condition on the probability is fulfilled, e.g., the random number does not exceed the probability.

d. Avoiding from compressing the new FSE metadata block when the condition on the probability is not fulfilled, e.g., the random number exceeds the probability.

According to an embodiment, the probability is zero up to a first value of the stress level and non-zero and lower than 1 between the first value of the stress level and a second value of the stress level.

According to an embodiment, the probability is zero up to a first value of the fullness of static FSE metadata blocks and non-zero between the first value of the fullness of static FSE metadata blocks and a second value of the fullness of static FSE metadata blocks.

According to an embodiment, the probability is zero up to a first value of the fullness of dynamic FSE metadata blocks and non-zero between the first value of the fullness of dynamic FSE metadata blocks and a second value of the fullness of dynamic FSE metadata blocks.

According to an embodiment the first value of the fullness of static FSE metadata blocks may be the same as the first value of the fullness of static FSE metadata blocks—or may differ from the first value of the fullness of static FSE metadata blocks.

According to an embodiment the second value of the fullness of static FSE metadata blocks may be the same as the second value of the fullness of static FSE metadata blocks—or may differ from the second value of the fullness of static FSE metadata blocks.

According to an embodiment method 300 is applied on current FSE metadata blocks—and not on (or not only on) new FSE metadata blocks.

Figure 4:
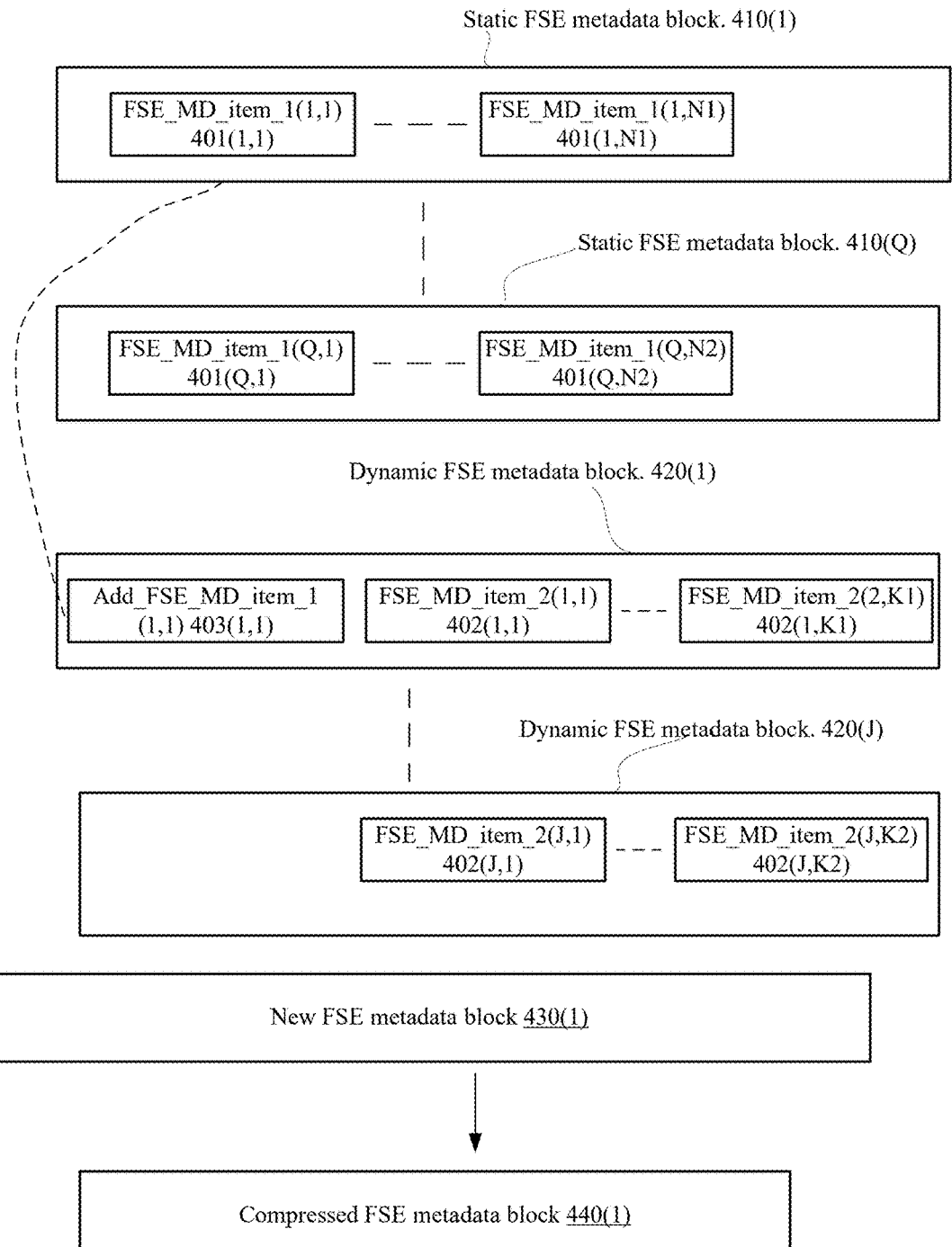
FIG. 4 is an example of metadata blocks and FSE metadata items.

FIG. 4 is an example of metadata blocks and FSE metadata items.

There are Q static FSE metadata blocks 410(1)-410(Q), J dynamic FSE metadata blocks 420(1)-420(J).

Static FSE metadata block 410(1) stores N1 FSE metadata items of a first type—FSE_MD_item_1(1,1) 401(1,1)-FSE_MD_item_1(1,N1) 401(1,N1).

Static FSE metadata block 410(Q) stores N2 FSE metadata items of a first type—FSE_MD_item_1(Q,1) 401(Q,1)-FSE_MD_item_1(Q,N2) 401(Q,N2).

Dynamic FSE metadata block 420(1) stores K1 FSE metadata items of a second type—FSE_MD_item_2(1,1) 402(1,1)-FSE_MD_item_1(1,K1) 402(1,K1) and also stores additional FSE metadata item of a first type-Add_FSE_MD_item_1(1,1) 403(1,1) that is referred to by static FSE metadata block 410(1). There may be dedicated dynamic FSE metadata blocks that store only spillover metadata items of the first type, and each such block is referred to by a static FSE metadata block that includes metadata items that correspond to the same hash value.

Dynamic FSE metadata block 420(J) stores K2 FSE metadata items of a second type—FSE_MD_item_2(J,1) 402(J,1)-FSE_MD_item_1(J,K2) 402(J,K2).

FIG. 4 also illustrates a compression of new FSE metadata block 430(1) to provide compressed FSE metadata block 440(1). Any of the blocks 410 and 420 may be compressed or uncompressed-according to decisions made by method 300.

Figure 5:
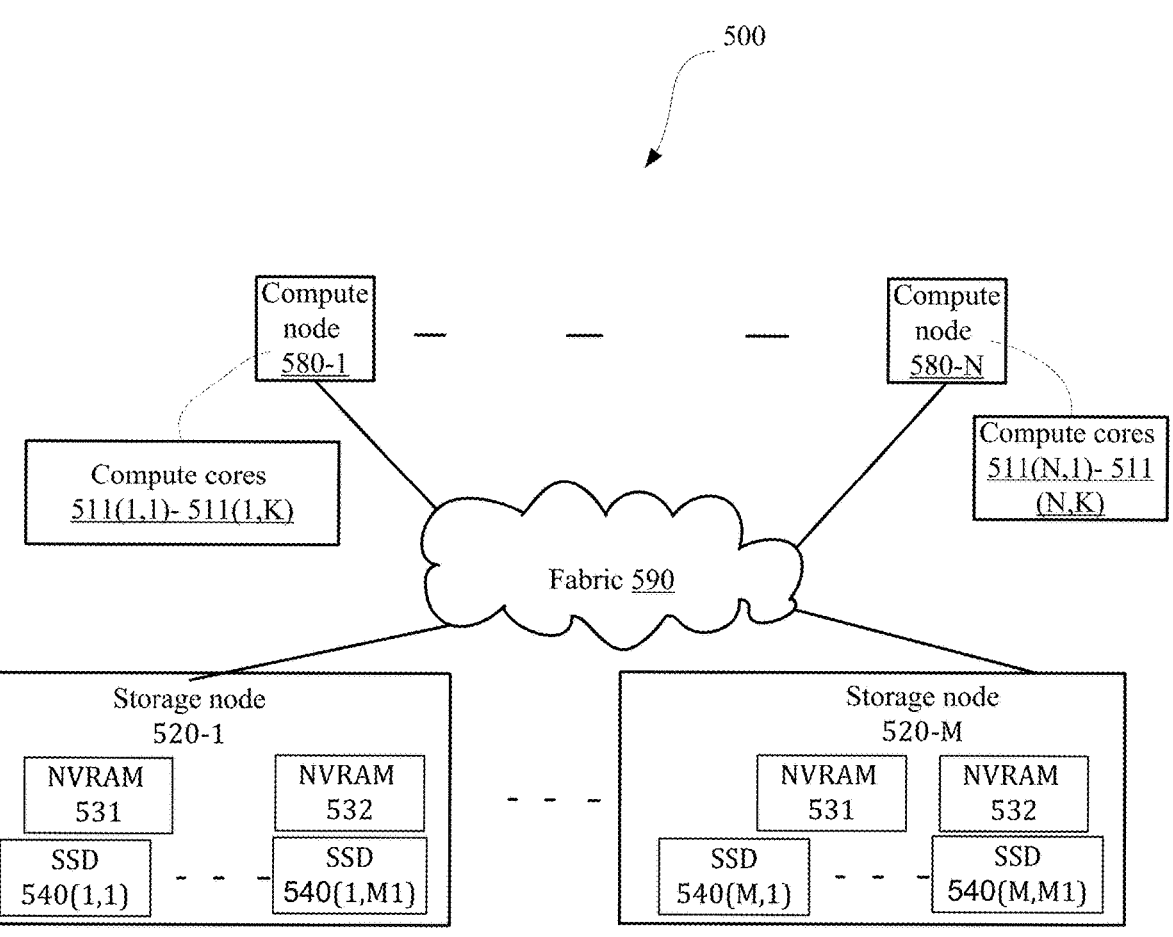
FIG. 5 is an example of a storage system.

FIG. 5 shows an example diagram of a storage system 400 for storing the metadata blocks and for implementing the conditional compression according to the disclosed embodiments.

The storage system 500 includes a number of N compute nodes 580-1 through 580-N. The compute nodes include (or may execute) multiple compute cores each—see for example compute cores 511(1,1)-511(1,K) and compute cores 511(N,1)-511(N,K). A compute core can be a processing circuit, a part of processing circuit, and the like. The processing circuit may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

The storage system 500 also includes a number of M storage nodes 520-1 through 520-M. The compute nodes 580 and the storage nodes 520 are connected through a communication fabric 590. M may equal N or may differ from N.

According to an embodiment, the compute nodes are configured to perform one or more steps of method 300 and to access the storage nodes where the metadata blocks are stored, for reading, updating, compressing and decompressing.

The storage nodes 520 provide the storage and state in the system 500. Each storage node 520 may include a plurality of SSDs. Storage node 520-1 includes M1 SSDs 540(1,1)-540(1,M1). Storage node 520-M includes M1 SSDs 540(M, 1)-540(M,M1).

According to an embodiment, the metadata blocks are stored in one or more of the NVRAM 531 and 532 or in one or more SSDs of FIG. 5.

A compute nodes 580 may be configured to communicate with the storage node 520 over the communication fabric 590. It should be noted that each compute node 580 can communicate with each storage node 520 over the communication fabric 590. Each compute node is further configured to perform direct memory access, over communication fabric 590, towards storage devices of the storage nodes. There may not be a direct coupling between a compute node 580 and storage node 520.

In the embodiment, the communication fabric 590 may include an Ethernet fabric, an InfiniBand fabric, and the like. Specifically, the communication fabric 590 may enable communication protocols such as, but not limited to, remote direct memory access (RDMA) over Converged Ethernet (ROCE), iWARP, Non-Volatile Memory Express (NVMe), and the like. It should be noted that the communication protocols discussed herein are provided merely for example purposes, and that other communication protocols may be equally utilized in accordance with the embodiments disclosed herein without departing from the scope of the disclosure.

Any reference to "may be" should also refer to "may not be".

In the foregoing detailed description, numerous specific details are set forth in order to provide a thorough understanding of the one or more embodiments of the disclosure. However, it will be understood by those skilled in the art that the present one or more embodiments of the disclosure may be practiced without these specific details. In other instances, well-known methods, procedures, and components have not been described in detail so as not to obscure the present one or more embodiments of the disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present one or more embodiments of the disclosure and in order not to obfuscate or distract from the teachings of the present one or more embodiments of the disclosure.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by a system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for managing metadata blocks of file system entities (FSEs), the method comprising:

determining, by a processing circuit of a hardware compute node of a storage system, a stress level that is non-linearly dependent upon a fullness of static FSE metadata blocks and a fullness of dynamic FSE metadata blocks, wherein the static FSE metadata blocks store FSE metadata items of a first type and the dynamic FSE metadata blocks store FSE metadata items of a second type and additional FSE metadata items of a first type;

storing in hardware storage nodes of the storage system, multiple new FSE metadata blocks, wherein the storing includes compressing, by the processing circuit, at least some of the multiple new FSE metadata blocks when the stress level is above zero, wherein the compressing comprises selecting a percentage of the at least some of the multiple new FSE metadata blocks out of the multiple new FSE metadata blocks, wherein the percentage is based on the stress level; wherein the hardware compute node belongs to multiple hardware compute nodes of the storage system that are in communication with the hardware storage nodes;

wherein storing of each of the multiple new FSE metadata blocks includes:

(i) determining, based on a current value of the stress level, a probability of applying a conditional compression process on a new FSE metadata block; and (ii) applying the conditional compression process, based on the probability, on the new FSE metadata block; wherein the applying comprises:

obtaining a random number;

comparing the random number to the probability of applying the conditional compression process on the new FSE metadata block;

compressing the new FSE metadata block when random number does not exceed the probability of applying the conditional compression process on the new FSE metadata block; and avoiding from compressing the new FSE metadata block when the random number exceeds the probability of applying the conditional compression process on the new FSE metadata block.

2. The method according to claim 1, wherein at least one of the FSE metadata items of a first type and at least one of the additional FSE metadata items of a first type share a same hash value.

3. The method according to claim 1, wherein the stress level is determined based on a square of the fullness of static FSE metadata blocks and of a square of the fullness of dynamic FSE metadata blocks.

4. The method according to claim 1, wherein the stress level is weighted sum of (i) a square of the fullness of static FSE metadata blocks, and (ii) a square of the fullness of dynamic FSE metadata blocks.

5. The method according to claim 4, weights of the weighted sum are determined based on an extremum value of at least one of the fullness of static FSE metadata blocks and the fullness of dynamic FSE metadata blocks.

6. The method according to claim 1, wherein the probability is zero up to a first value of the stress level and non-zero and lower than 1 between the first value of the stress level and a second value of the stress level.

7. The method according to claim 1, comprising determining, based on the stress level and the fullness parameter, a probability of applying the conditional compression process on an existing FSE metadata block; and applying the conditional compression process, based on the probability, on the existing FSE metadata block.

8. The method according to claim 1, wherein the probability is zero up to a first value of the fullness of static FSE metadata blocks and non-zero between the first value of the fullness of static FSE metadata blocks and a second value of the fullness of static FSE metadata blocks.

9. The method according to claim 1, wherein the probability is zero up to a first value of the fullness of dynamic FSE metadata blocks and non-zero between the first value of the fullness of dynamic FSE metadata blocks and a second value of the fullness of dynamic FSE metadata blocks.

10. A non-transitory computer readable medium for managing metadata blocks of file system entities (FSEs), the non-transitory computer readable medium stores instructions executable by a storage system for:

determining, by a processing circuit of a hardware compute node of the storage system, a stress level that is non-linearly dependent upon a fullness of static FSE metadata blocks and a fullness of dynamic FSE metadata blocks, wherein the static FSE metadata blocks store FSE metadata items of a first type and the dynamic FSE metadata blocks store FSE metadata items of a second type and additional FSE metadata items of a first type;

storing, in hardware storage nodes of the storage system, multiple new FSE metadata blocks, wherein the storing includes compressing, by the processing circuit, at least some of the multiple new FSE metadata blocks when the stress level is above zero, wherein the compressing includes selecting a percentage of the at least some of the multiple new FSE metadata blocks out of the multiple new FSE metadata blocks, wherein the percentage is based on the stress level; wherein the hardware compute node belongs to multiple hardware compute nodes of the storage system that are in communication with the hardware storage nodes;

wherein storing of each of the multiple new FSE metadata blocks includes:

(i) determining, based on a current value of the stress level, a probability of applying a conditional compression process on a new FSE metadata block; and (ii) applying the conditional compression process, based on the probability, on the new FSE metadata block; wherein the applying comprises:

obtaining a random number;

comparing the random number to the probability of applying the conditional compression process on the new ESE metadata block;

compressing the new FSE metadata block when random number does not exceed the probability of applying the conditional compression process on the new ESE metadata block; and avoiding from compressing the new ESE metadata block when the random number exceeds the probability of applying the conditional compression process on the new ESE metadata block.

11. The non-transitory computer readable medium according to claim 10, wherein at least one of the FSE metadata items of a first type and at least one of the additional FSE metadata items of a first type share a same hash value.

12. The non-transitory computer readable medium according to claim 10, wherein the stress level is determined based on a square of the fullness of static FSE metadata blocks and of a square of the fullness of dynamic FSE metadata blocks.

13. The non-transitory computer readable medium according to claim 10, wherein the stress level is weighted sum of (i) a square of the fullness of static FSE metadata blocks, and (ii) a square of the fullness of dynamic FSE metadata blocks.

14. The non-transitory computer readable medium according to claim 13, weights of the weighted sum are determined based on an extremum value of at least one of the fullness of static FSE metadata blocks and the fullness of dynamic FSE metadata blocks.

15. The non-transitory computer readable medium according to claim 10, wherein the probability is zero up to a first value of the stress level and non-zero and lower than 1 between the first value of the stress level and a second value of the stress level.

16. The non-transitory computer readable medium according to claim 10, that stores instructions executable by the processor for determining, based on the stress level and the fullness parameter, a probability of applying the conditional compression process on an existing FSE metadata block; and applying the conditional compression process, based on the probability, on the existing FSE metadata block.

17. The non-transitory computer readable medium according to claim 10, wherein the probability is zero up to a first value of the fullness of static FSE metadata blocks and non-zero between the first value of the fullness of static FSE metadata blocks and a second value of the fullness of static FSE metadata blocks.

18. The non-transitory computer readable medium according to claim 10, wherein the probability is zero up to a first value of the fullness of dynamic ESE metadata blocks and non-zero between the first value of the fullness of dynamic ESE metadata blocks and a second value of the fullness of dynamic ESE metadata blocks.

* * * * *